(12) United States Patent
Cha et al.

(10) Patent No.: US 8,833,125 B2
(45) Date of Patent: Sep. 16, 2014

(54) SWAGING APPARATUS

(75) Inventors: Jung-Bae Cha, Yongin-si (KR); Jae-Ho Jeong, Yongin-si (KR); Kyung-Doo Ha, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 715 days.

(21) Appl. No.: 13/071,957

(22) Filed: Mar. 25, 2011

(65) Prior Publication Data

US 2012/0047982 A1 Mar. 1, 2012

(30) Foreign Application Priority Data

Aug. 26, 2010 (KR) ........................ 10-2010-0083048

(51) Int. Cl.
*B21D 41/04* (2006.01)
*B21D 43/14* (2006.01)
*H01M 2/12* (2006.01)
*B21D 51/26* (2006.01)
*H01M 2/10* (2006.01)

(52) U.S. Cl.
CPC ............. *B21D 41/04* (2013.01); *H01M 2/1223* (2013.01); *Y02E 60/12* (2013.01); *B21D 51/2669* (2013.01); *H01M 2/105* (2013.01); *H01M 2/1022* (2013.01)
USPC ............. 72/125; 72/76; 72/379.4; 72/405.03; 72/465.1; 72/466.9

(58) Field of Classification Search
CPC ................ B21J 7/14; B21J 7/16; B21D 3/10; B21D 22/16; B21D 41/04; B21D 43/14; B21D 51/10

USPC ............... 72/76, 82, 125, 343, 347, 348, 350, 72/308, 309, 316, 317, 367.1, 370.12, 72/379.4, 405.03, 465.1, 466.9; 29/623.1
See application file for complete search history.

(56) References Cited

U.S. PATENT DOCUMENTS 1,963,942 A * 6/1934 Flynn ................................ 72/76
2,960,051 A * 11/1960 Darlington, Jr. ................ 72/123
(Continued)

FOREIGN PATENT DOCUMENTS

| CN | 101361207 A | 2/2009 |
| CN | 101627489 A | 1/2010 |

(Continued)

OTHER PUBLICATIONS

Japanese Notice of Allowance dated Dec. 4, 2012 issued by JPO in the corresponding Japanese patent application 2010-251598 with Request for Entry of the Accompanying Office Action.

(Continued)

*Primary Examiner* — Edward Tolan
(74) *Attorney, Agent, or Firm* — Robert E. Bushnell, Esq.

(57) ABSTRACT

Provided is a swaging apparatus for smoothly swaging a can of a rechargeable battery by absorbing excessive load above a predetermined level between a rod of a driving part and a collet of a driven part. A swaging apparatus according to an exemplary embodiment includes a collet housing for swaging a can including an electrode assembly, a collet for swaging an opening of the can inserted in the collet housing, a shock-absorbing part disposed in the collet housing and connected to the collet, and a rod connected to the shock-absorbing part to transmit a swaging load to the collet through the shock-absorbing part.

15 Claims, 5 Drawing Sheets

(56) References Cited

U.S. PATENT DOCUMENTS

| | | | |
|---|---|---|---|
| 4,502,308 A | | 3/1985 | Kelly |
| 4,581,817 A | | 4/1986 | Kelly |
| 4,590,668 A | * | 5/1986 | Peachee, Jr. .................... 29/596 |
| 6,463,781 B2 | * | 10/2002 | Watanabe et al. ................ 72/424 |
| 7,861,572 B2 | * | 1/2011 | Geser ......................... 72/370.13 |
| 8,146,251 B2 | * | 4/2012 | Kobayashi et al. ............. 29/890 |
| 2004/0060160 A1 | * | 4/2004 | Nishimura et al. ............. 29/525 |
| 2004/0140600 A1 | | 7/2004 | Brehm et al. |
| 2007/0181635 A1 | | 8/2007 | Otaki et al. |
| 2009/0274957 A1 | | 11/2009 | Goda et al. |

FOREIGN PATENT DOCUMENTS

| | | | | |
|---|---|---|---|---|
| CN | 101743652 A | | 6/2010 | |
| JP | 55084645 | | 6/1980 | |
| JP | 63-138938 | | 9/1988 | |
| JP | 3-258434 A | * | 11/1991 | ................ B21J 7/16 |
| JP | 06215792 | | 8/1994 | |
| JP | 10-97851 A | * | 4/1998 | ............ B21D 51/26 |
| JP | 10-166099 A | | 6/1998 | |
| JP | 2003071600 | | 3/2003 | |
| JP | 2004330288 | | 11/2004 | |
| KR | 10-2002-0006796 | | 1/2002 | |
| WO | 2009/107318 A1 | * | 9/2009 | ............ B23D 23/00 |

OTHER PUBLICATIONS

Korean Office Action issued on Jun. 29, 2012 by the Korean Intellectual Property Office in the corresponding Korean Patent Application No. 10-2010-0083048.

The SIPO OA issued by SIPO on Aug. 26, 2013, whose application No. 2011101285512 corresponds to KR 10-2010-0083048.

Japanese Office Action issued by JPO on Jun. 19, 2012 in connection with Japanese Patent Application No. 2010-251598, which also claims Korean Patent Application No. 10-2010-0083048 and Request for Entry of the Accompanying Office Action attached herewith.

SIPO Office Action issued on Apr. 1, 2014 in connection with Chinese Patent Application Serial No. 201110128551.2 which also claims Korean Patent Application No. 2010-00803048 as its priority document.

* cited by examiner

FIG. 5

SWAGING APPARATUS

CLAIM OF PRIORITY

This application makes reference to, incorporates the same herein, and claims all benefits accruing under 35 U.S.C. §119 from an application earlier filed in the Korean Intellectual Property Office on 26 Aug. 2010 and there duly assigned Serial No. 10-2010-0083048.

BACKGROUND OF THE INVENTION

1. Field of the Invention

The disclosure relates to a swaging apparatus that swages the can of a rechargeable battery.

2. Description of the Related Art

Swaging apparatuses, for example, include a driven part applying a swaging load to an object and a driving part transmitting the swaging load to the driven part. In general, a rod of the driving part is directly connected to a collet of the driven part. That is, a driving force of the driving part is transmitted as the swaging load to the collet of the driven part through the rod of the driving part.

A process of manufacturing a rechargeable battery, for example, includes a can swaging process, in which an electrode assembly is inserted into a can formed of a cylinder through an expanded opening of the can, and the expanded opening of the can is swaged (or tapered) into a cylindrical shape after the electrode assembly is inserted into the can. Through the expanded opening of the can, the electrode assembly is easily inserted into the can.

The can swaging process may require a large load at the driven part that swages the opening of the can, such that the large load is applied to the friction surface between the driven part and the driving part.

The driving force of the driving part may excessively increase or may change due to abnormal operation of the driving part, while swaging the can. Accordingly, the stroke of the rod of the driving part may change. Further, the position or alignment of the collet may be inappropriately set by an error during the assembly process of the driving part and the driven part. Accordingly, there may be a difference in the amount of displacement between the driving part and the driven part.

That is, with a rigid body mechanically formed by directly connecting the rod of the driving part with the collet of the driven part, a change in rod stroke and a difference in the amount of displacement may cause defects in the swaged can or may damage the collet and the housing of the driven part.

The above information disclosed in this Background section is only for enhancement of understanding of the background of the described technology and therefore it may contain information that does not form the prior art that is already known in this country to a person of ordinary skill in the art.

SUMMARY OF THE INVENTION

The described technology has been made in an effort to provide a swaging apparatus having advantages of being able to smoothly perform a swaging process, even in an abnormal operation of the driving part which may be generated in the swaging apparatus.

The described technology has also been made in an effort to provide a swaging apparatus having advantages of being able to smoothly perform a swaging process by absorbing load above a predetermined level between the rod of the driving part and the collet of the driven part.

An exemplary embodiment provides a swaging apparatus that includes a collet housing for swaging a can including an electrode assembly, a collet for swaging an opening of the can inserted in the collet housing, a shock-absorbing part disposed in the collet housing and connected to the collet for absorbing shock, and a rod connected to the shock-absorbing part to transmit a swaging load to the collet through the shock-absorbing part.

The swaging apparatus may further include a load cell disposed between the shock-absorbing part and the rod.

The swaging apparatus may further include a shaft that is rotatable, a turret mounted to the shaft to integrally rotate with the shaft where the collet housing being mounted to the turret, a bearing mounted to a portion of the rod protruding out of the turret, and a cam track fixed in a position. The cam track initiates a movement of the rod through the bearing.

The shock-absorbing part may include a cylinder connected to the collet, a piston disposed inside the cylinder where the piston is connected to an end of the rod, and a first elastic member disposed inside the cylinder. The first elastic member is disposed between the piston and a wall of the cylinder to support the piston.

The first elastic member may include a plurality of disc springs with the rod positioned through the center of the disc springs.

The swaging apparatus may further include a second elastic member disposed inside the collet housing. The second elastic member is disposed between a wall of the collet housing and the shock-absorbing part.

The swaging apparatus may further include a can pusher mounted on an end portion of the shaft to support a side of the can.

The collet may be capable of applying a swaging load of 300 kgf±50 kgf to swage the can.

The collet may reshape the can in a cylindrical shape by narrowing an expanded opening of the can.

According to the exemplary embodiment, it is possible to smoothly swage the opening of a can by including a shock-absorbing part between a collet swaging the opening of the can in a collet housing and a rod transmitting swaging load, and absorbing excessive load above a predetermined level in load applied to the rod, by using the shock-absorbing part, in abnormal operation of a driving part during swaging.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

A swaging apparatus includes a driven part applying a swaging load to a can including an electrode assembly and a driving part transmitting the swaging load to the driven part. In general, a rod of the driving part is connected to a collet of the driven part. A driving force of the driving part is transmitted as the swaging load to the collet of the driven part through the rod of the driving part. A process of manufacturing a rechargeable battery includes a can swaging process, in which an electrode assembly is inserted into a can formed of a cylinder through an expanded opening of the can, and the expanded opening of the can is swaged (or tapered) into a cylindrical shape after the electrode assembly is inserted into the can. Through the expanded opening of the can, the electrode assembly is easily inserted into the can.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

Figure 1:
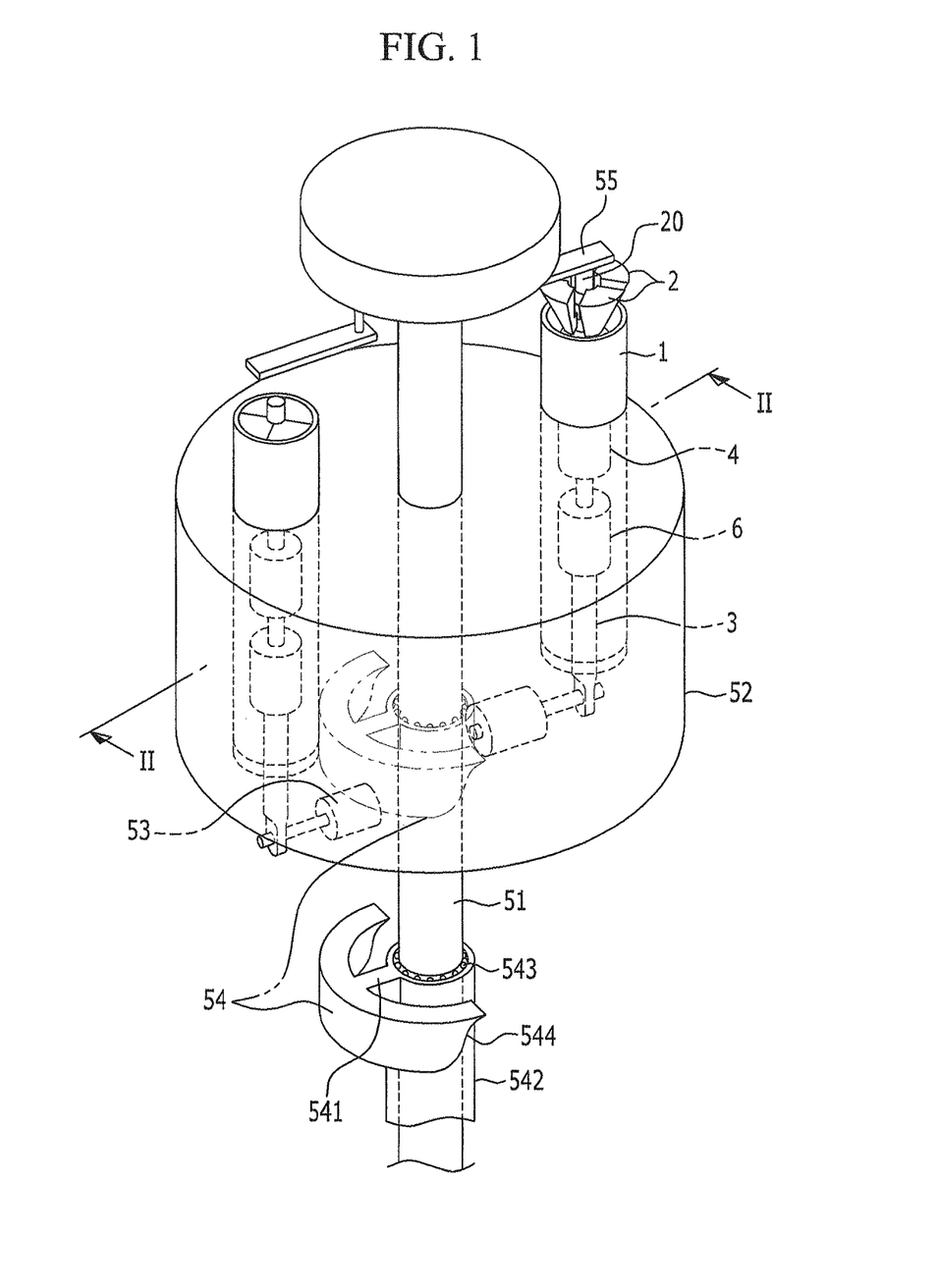
FIG. 1 is a perspective view of a swaging apparatus according to an exemplary embodiment.
Figure 2:
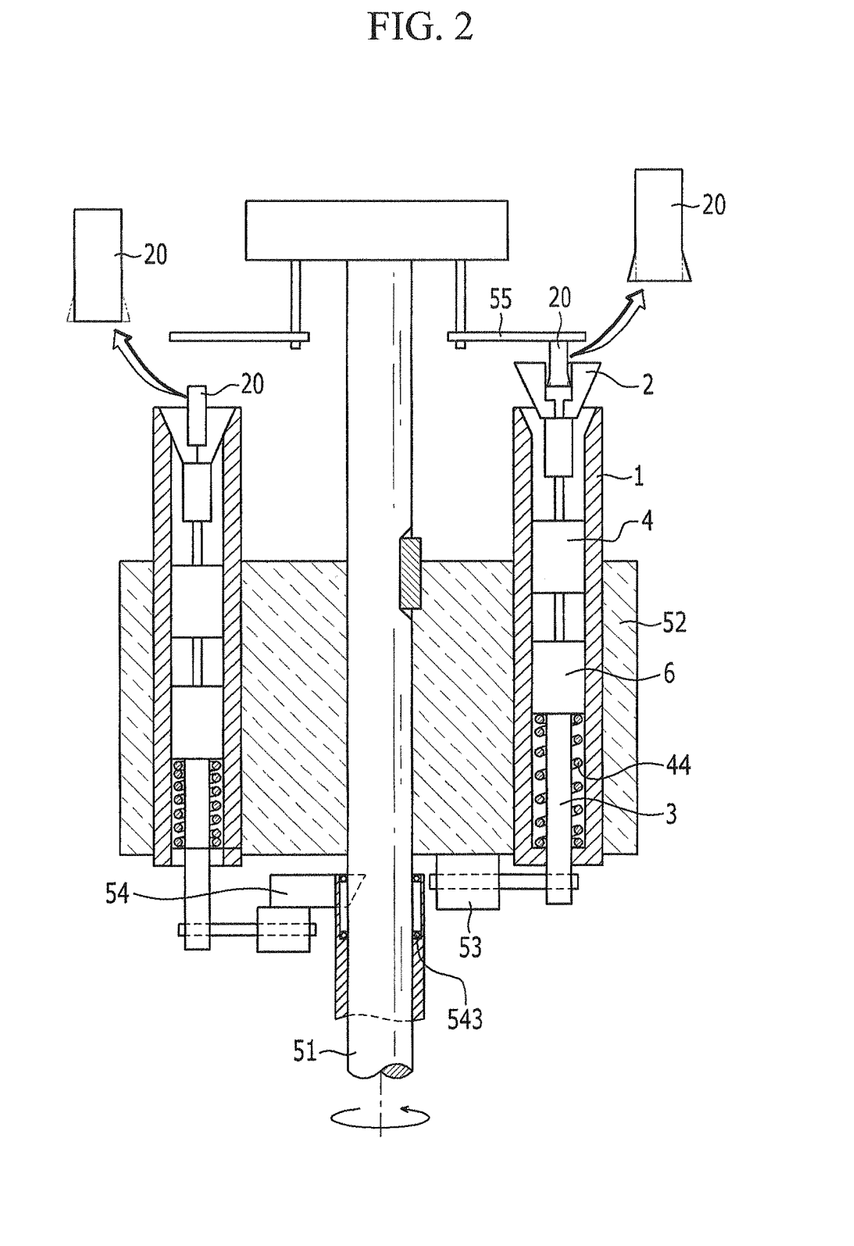
FIG. 2 is a cross-sectional view taken along the line II-II of FIG. 1.

FIG. 1 is a perspective view of a swaging apparatus according to an exemplary embodiment and FIG. 2 is a cross-sectional view taken along the line II-II of FIG. 1. Referring to FIG. 1 and FIG. 2, a swaging apparatus includes a collet housing 1 and a collet 2 that swage a can 20 of a rechargeable battery 100 (shown in FIG. 3), a rod 3 transmitting swaging load to the collet 2, and a shock-absorbing part 4 disposed between the collet 2 and the rod 3.

Figure 3:
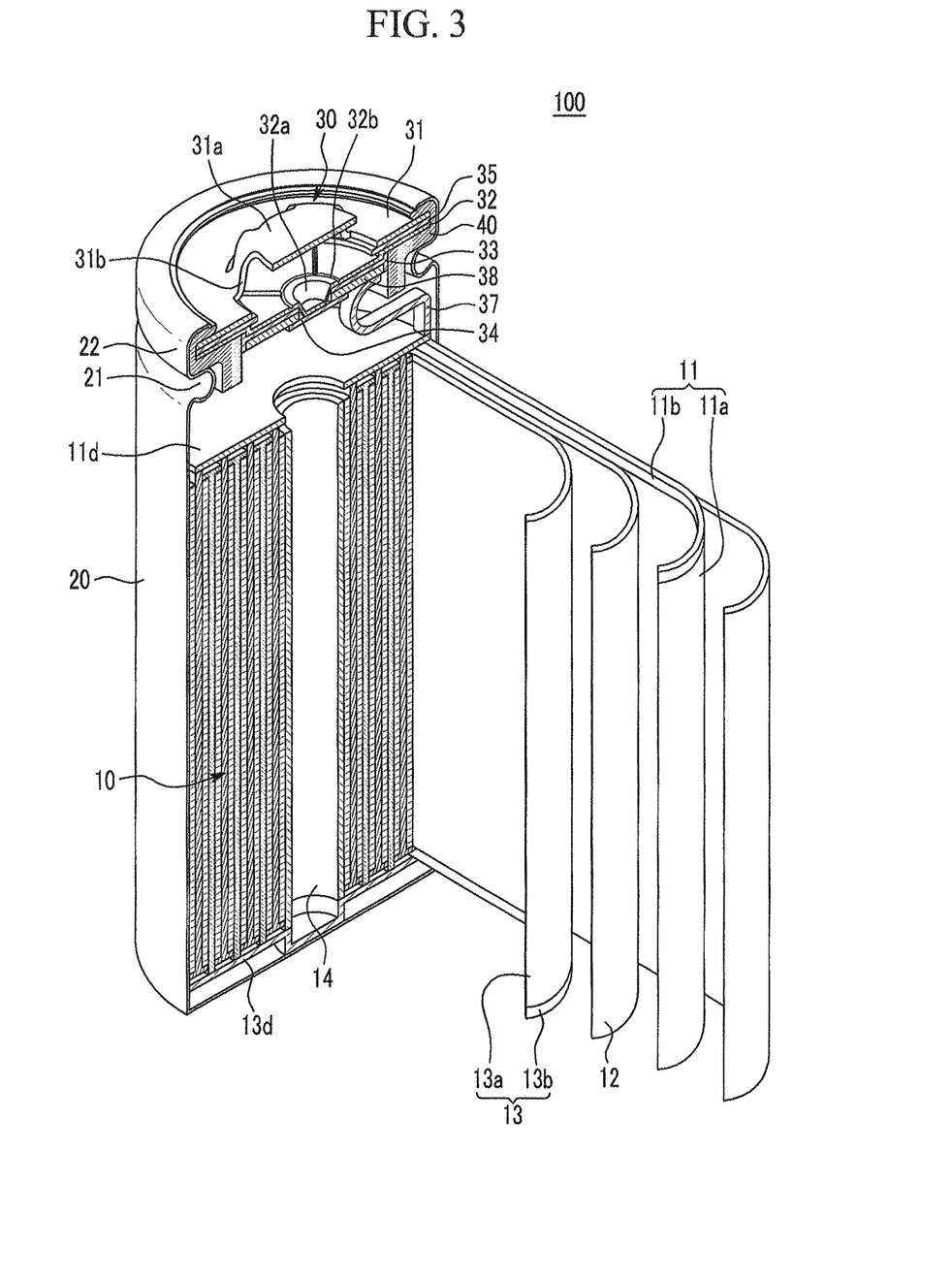
FIG. 3 is a cross-sectional view of a rechargeable battery manufactured by the swaging apparatus shown in FIG. 1.

Meanwhile, the can 20 that is inserted into the swaging apparatus accommodates an electrode assembly 10 (see FIG. 3). The can 20 has an opening expanded before inserting the electrode assembly 10 in order to make it easy to insert the electrode assembly 10 into the can 20 while preventing the electrode assembly 10 from being damaged.

Therefore, the swaging apparatus performs a swaging process, after the electrode assembly 10 is inserted in the can 20, to reshape the can 20 into the shape before the expansion of the opening of the can 20, For example, the can 20 is deformed from a pipe shape having a splayed or expanded open end into a pipe shape having a constant diameter. FIG. 2 exemplarily shows the can 20 (left side) swaged from the can 20 (right side) having expanded opening. The can 20 at the right side of FIG. 2 is reshaped into the can 20 at the left side.

The can 20 is inserted into the collet 2, with the expanded opening toward the collet 2, after completing the insertion of the electrode assembly 10 through expanded the opening of the can 20. The swaging load of the rod 3 is transmitted to the collet 2 through the shock-absorbing part 4, such that the expanded opening of the can 20 is swaged in the collet housing 1.

For example, when the driving part normally operates, the shock-absorbing part 4 operates as a rigid body transmitting the swaging load within a predetermined range from the rod 3 to the collet 2. When the driving part abnormally operates, the shock-absorbing part 4 absorbs shock. In other words, the shock-absorbing part 4 absorbs an amount of the load above the predetermined range, and transmits the swaging load within the predetermined range from the rod 3 to the collet 2.

The swaging apparatus according to the exemplary embodiment can smoothly swage the can while preventing damage to the collet housing 1 and the collet 2, by the shock absorption of the shock-absorbing part 4, even in an abnormal operation with excessively large swaging load.

Further, the swaging apparatus may further include a load cell 6 disposed between the shock-absorbing part 4 and the rod 3. In swaging a can, the load cell 6 makes it possible to take appropriate measures, by measuring swaging load generated in the collet 2 and ascertaining whether the swaging load is appropriate.

FIG. 3 is a cross-sectional view of a rechargeable battery after the swaging process with the swaging apparatus of FIG. 1. Referring to FIG. 3, a rechargeable battery 100 includes an electrode assembly 10 collecting and discharging current, a can 20 accommodating the electrode assembly 10, and a cap assembly 30 combined with the can 20 to be electrically connected to the electrode assembly 10.

The electrode assembly 10 includes a positive electrode 11, a separator 12, and a negative electrode 13, which are sequentially stacked. For example, the electrode assembly 10 is formed by winding the stack of the positive electrode 11, the negative electrode 13, and the separator 12 that is an insulator disposed between the electrodes, in a jelly roll shape. For example, the electrode assembly 10 is formed in a cylinder shape. A sector pin 14 is disposed at the center of the cylindrical electrode assembly 10 to maintain the cylindrical shape of the electrode assembly 10.

The positive electrode 11 and the negative electrode 13 include coated regions 11a and 13a applied with an active material on both sides of the current collector formed of a thin metal plate and uncoated regions 11b and 13b without an active material to expose the current collector, at opposite sides. In the jelly roll, a positive current collecting plate 11d is connected to the uncoated region 11b of the positive electrode 11, and a negative current collecting plate 13d is connected to the uncoated region 13b of the negative electrode 13.

The can 20 is open at one side to insert the electrode assembly 10, and is formed in a cylindrical shape to accommodate the cylindrical electrode assembly 10. The can 20 is connected to the negative current collecting plate 13d to function as a negative terminal in the rechargeable battery 100. The can 20 may be made of a conductive metal, for example steel.

The cap assembly 30 is connected to the open side of the can 20 through a gasket 40 and seals the can 20 accommodating the electrode assembly 10 and electrolyte solution. Further, the cap assembly 30 has a current-cutting unit and is electrically connected to the electrode assembly 10 through the current-cutting unit.

For example, the cap assembly 30 includes a cap plate 31, a vent plate 32, an insulating plate 33 a sub-plate 34, a positive temperature coefficient element 35 and a middle plate 38.

The cap plate 31 is consequently connected to the positive current collecting plate 11d to function as a positive terminal in the rechargeable battery 100. The cap plate 31 forms a protrusion 31a protruding outward from the can 20 and an exhaust hole 31b formed at a side of the protrusion 31a.

Substantially, the current-cutting unit is formed by the vent plate 32, and the sub-plate 34 and a connecting portion of the current-cutting unit is formed by welding the vent plate 32 with the sub-plate 34. The vent plate 32 forming one side of the current-cutting unit is disposed inside the cap plate 31 to be electrically connected to the sub-plate 34 forming the other side of the current-cutting unit.

Further, the vent plate 32 discharges the gas inside the rechargeable battery 100 by breaking under a predetermined pressure condition, and includes a vent 32a formed to cut the electric connection with the sub-plate 34. When the current-cutting unit operates. That is, the vent plate 32 is disconnected from the sub-plate 34 by breaking of the vent 32a, and then, the electrode assembly 10 and the cap plate 31 are electrically disconnected.

For example, the vent 32a protrudes inside the can 20 from the vent plate 32. The vent plate 32 has a notch 32b help the vent 32a break around the vent 32a. The notch 32b breaks in advance and discharges the gas to prevent the rechargeable battery 100 from exploding, when pressure is increased by the gas generated in the can 20.

The positive temperature coefficient element 35 is disposed between the plate 31 and the vent plate 32 to cut or allows for current flow between the cap plate 31 and the vent plate 32. Above predetermined temperature, the positive temperature coefficient element 35 has electrical resistance that infinitely increases and cuts the flow of charging or discharging current.

The sub-plate 34 is positioned opposite to the vent plate 32 with the insulating plate 33 therebetween and electrically connected to the vent 32a. The middle plate 38 is disposed between the insulating plate 33 and the sub-plate plate 34. The vent 32a protruding through the through-holes of the insulating plate 33 and the middle plate 38 is connected to the sub-plate 34.

Therefore, the middle plate 38 is electrically connected to the vent plate 32 through the sub-plate 34 and the vent 32a at one side, and connected to the positive current collecting plate 11d through a connecting member 37 at the other side.

As a result, the positive current collecting plate 11d is electrically connected to the cap plate 31 through the connecting member 37, the middle plate 38, the sub-plate 34, the vent 32a, the vent plate 32, and the positive temperature coefficient element 35.

The cap assembly 30 formed as described above is connected to the opening of the can 20 after undergoing swaging of the can accommodating the electrode assembly 10. Therefore, the rechargeable battery 100 may have a beading portion 21 and a clamping portion 22 on the can 20.

Returning to FIG. 1 and FIG. 2, the can 20 to be swaged is inserted with the electrode assembly 10 assembled, before being assembled with the cap assembly 30. A swaging apparatus according to the exemplary embodiment may be composed of the collet housing 1, the collet 2, the rod 3, and the shock-absorbing part 4, or may include a plurality of collet housings 1, collets 2, and rods 3, and further a configuration for operating the rods 3, thereby increasing efficiency in swaging the can.

Hereinafter, a swaging apparatus including a plurality of collet housings 1, collets 2, and rods 3 is exemplified. Further, for better comprehension and ease of description, a swaging apparatus shown in FIGS. 1 and 2 including two collet housings 1, two collets 2, and two rods 3 is exemplified.

A swaging apparatus according to the exemplary embodiment further includes a shaft 51, a turret 52, a bearing 53, a cam track 54, and a can pusher 55, in order to operate the collet housings 1, the collets 2, and the rods 3.

For example, the shaft 51 is connected to a driving part (not shown) to rotate and vertically disposed to effectively swage the can. In other words, the shaft 51 is rotatable about a central axis of the shaft. Further, the turret 52 is mounted on the shaft 51 to integrally rotate with the shaft 51 and has a circular plate shape equipped with the collet housings 1.

The collet housings 1 are arranged at equal distances along the circumference of the turret 52, radially apart from the center of the turret 52. The larger the diameter of the turret 52 is, the more the collet housings 1 and the collets 2 can be mounted.

Therefore, as the shaft 51 and the turret 52 rotate, a can is swaged in one collet housing 1 while another can 20 to be swaged can be put into or a swaged can 20 can be discharged from the other collet housing 1.

The collet housing 1 is disposed perpendicular to the turret 52 and the collet 2 is formed to swage the opening of the can 20 vertically (i.e. in the axial direction) put into the collet housing 1.

For example, the collet 2 is made to apply swaging load of 300 kgf±50 kgf to swage the opening of the cylindrical can 20 made of steel. The collet housing 1 and the collet 2 can be manufactured in the well-known configuration and the detailed description is not provided. However, when the cylindrical can 20 is used, the collet 2 is made to receive and swage the expanded opening of the can 20 in a straight cylindrical opening. As shown in FIG. 2, the collet 2 moves upwards or downwards, and the collet housing 1 guides the movement of the collet 2.

The shock-absorbing part 4 is disposed in the collet housing 1, and is axially connected to the collet 2, and the rod 3 is axially connected to the shock-absorbing part 4 at the opposite side to the collet 2. That is, the collet 2 is connected to the rod 3 transmitting the swaging load through the shock-absorbing part 4. Therefore, the swaging load is transmitted to the collet 2 through the rod 3 and the shock-absorbing part 4. In this case, the shock-absorbing part 4 functions as a rigid body or absorbs shock, in accordance with the magnitude of the swaging load.

The bearing 53 is mounted to the rod 3 protrudes towards the shaft 51. The bearing 53 is disposed under the turret 52, while the collet 2 is disposed above the turret 52 through the collet housing 1. The rod 3 is axially disposed and the bearing 53 is attached to the lower end of the rod 3 at right angle. For example, the bearing 53 is formed in a cylindrical shape and the central extending line of the cylinder is aligned to be perpendicular to the axis of the shaft 51.

The cam track 54 is disposed at one side of the shaft 51, and has an arc shape curved in the rotational direction of the turret 52. The cam track 54 is fixed in a position at a side of the shaft 51 in a manner that the cam track 54 does not rotate with the shaft 51. That is, even as the shaft 51 and the turret 52 rotate, the cam track 54 is kept fixed at a predetermined position, and supports the bearing 53 when the bearing 53 moves beneath the cam track 54. Therefore, with the rotation of the turret 52, the bearings 53 can transmit the swaging load to the rod 3 while sequentially passing the cam track 54.

For example, the cam track 54 is fixed to an external shaft 542 through a rib 541. The external shaft 542 is disposed to enclose the shaft 51. The external shaft 542 is coupled to the swaging apparatus by the bearing 543 so that the external shaft 542 supports the rotation of the shaft 51 while being fixed in a position. In other words, the external shaft 542 does not interfere with rotation of the shaft 51. Further, the cam track 54 has an inclined surface 544 at both ends to smoothly guide the bearing 53. The bearing 53, rotating with the turret 52, moves down pulling the rod 3 downwards while sliding beneath the cam track 54. Otherwise, the bearing 53 move up pushing the rod 3 upwards.

Therefore, as the shaft 51 and the turret 52 rotate, the rod 3 connected to the collet 2 is supported by the bearing 53, and moved up and down along the cam track 54. In other words, the cam track 54 initiates the movement of the rod 3. Referring to FIG. 2, the rod 3 at the right side is moved up by elastic force of a second elastic member 44, which is described below, as the bearing 53 is out of the cam track 54, which also can be described as that the bearing 53 is not coupled to the cam track 54. The rod 3 at the left side is moved down, as the bearing 53 is supported by the cam track 54, which can be described as that the bearing 53 is coupled to the cam track 54. As shown in FIG. 2, the collet 2 (right side) is at a first position whenever the bearing 53 is not coupled to the cam track 54, and the collet 2 (left side) is at a second position whenever the bearing 53 is coupled to the cam track 54.

The can pusher 55 is mounted at the top portion of the shaft 51 to face the collets 2. When the collet 2 connected to the rod 3 has been moved up out of the collet housing 1 by the elastic force of the second elastic member 44, the can pusher 55 positions the can 20 in the collet 2 by applying force to the top of the can 20 against the lifting force of the collet 2. The can 20 can be swaged without departing from the collet 2 by the press of the can pusher 55.

As the turret 52 rotates, the bearing 53 is supported by the cam track 54, and moves the rod 3 down. As the collet 2 connected to the rod 3 is moved down, the can 20 is swaged. In this operation, the can pusher 55 is spaced apart from the top of the can 20 that is swaged.

Figure 4:
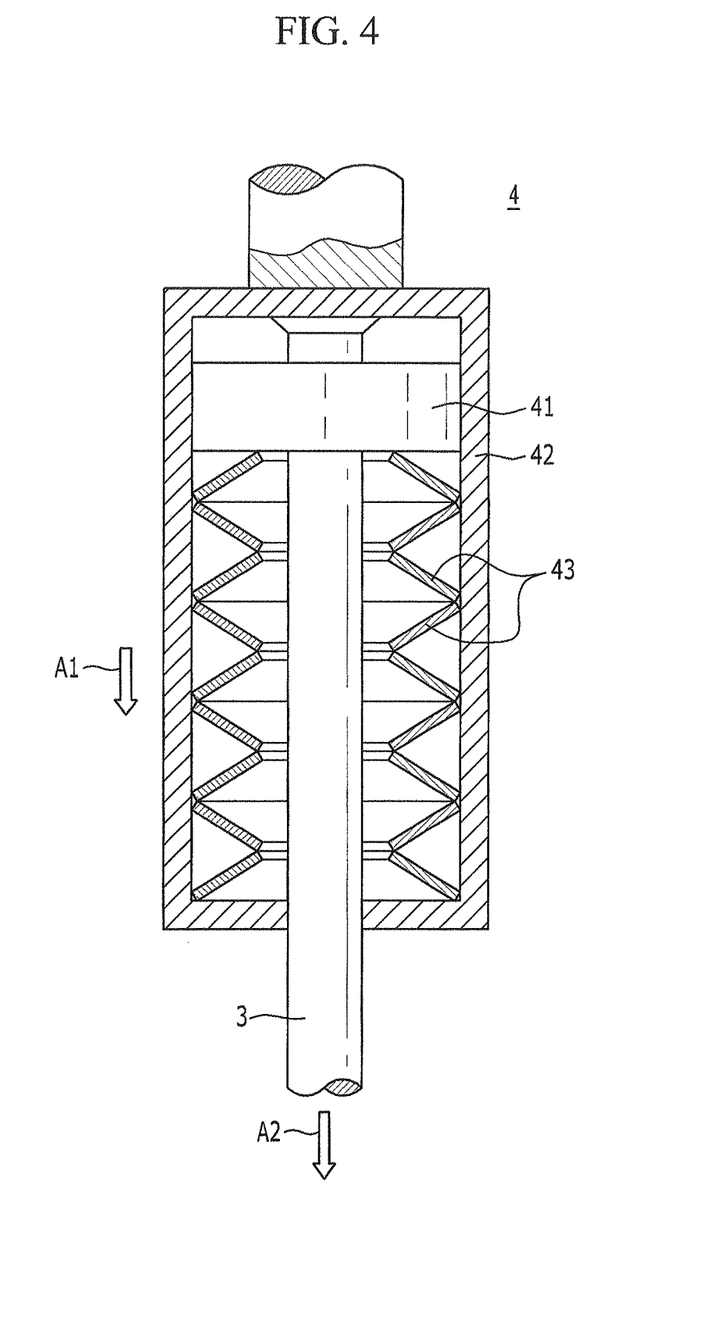
FIG. 4 is a cross-sectional view when a shock-absorbing part of FIG. 2 operates as a rigid body.

FIG. 4 is a cross-sectional view when a shock-absorbing part of FIG. 2 operates as a rigid body. Referring to FIG. 4, the shock-absorbing part 4 includes a piston 41 connected to the top of the rod 3, a cylinder 42 connected to the collet 2 and accommodating the piston 41, and a first elastic member 43 supporting the piston 41 in the cylinder 42.

The first elastic member 43 is disposed inside the cylinder 42. While the collet 2 is connected to the upper wall (first wall) of the cylinder 42, the first elastic member 43 is disposed between the piston 41 and the lower wall (second wall) of the cylinder 42 to move the piston 41 and the rod 3 up, and to move the collet 2 down. That is, the first elastic member 43 is disposed between the bottom of the piston 41 and the lower wall of the cylinder 42, which faces the bottom of the piston.

For example, the first elastic member 43 may be a disc spring disposed to encircle the rod 3 in the cylinder 42. The first elastic member 43 may include several other members, in accordance with the gap between the bottom of the piston 41 and the opposite surface of the cylinder 42.

Returning to FIG. 2, the second elastic member 44 is disposed between the lower wall of the collet housing 1 and the shock-absorbing part 4 to support the cylinder 42 of the shock-absorbing part 4 such that the rod 3 and the shock-absorbing part 4 are moved up. The second elastic member 44 may be confined in a space between the lower wall of the collet housing 1 and the load cell 6. As the load cell 6 is rigidly attached to the rod 3, the movement of the second elastic member 44 is transmitted to the shock-absorbing part 4.

Referring to FIG. 2 and FIG. 4, as the turret 52 rotates with the rotation of the shaft 51, the bearing 53 connected to the rod 3 moves down while being supported by the cam track 54 (left in FIG. 2). In this operation, the load is normally transmitted to the piston 41, the first elastic member 43, and the cylinder 42 of the shock-absorbing part 4 through the rod 3, such that the shock-absorbing part 4 operates as a rigid body.

That is, the shock-absorbing part 4 and the rod 3 move at the same distance (A1=A2, shown by the arrow length in FIG. 4). Therefore, the swaging load transmitted to the bearing 53 and the rod 3 is fully transmitted to the collet 2, such that the can 20 is normally swaged.

Figure 5:
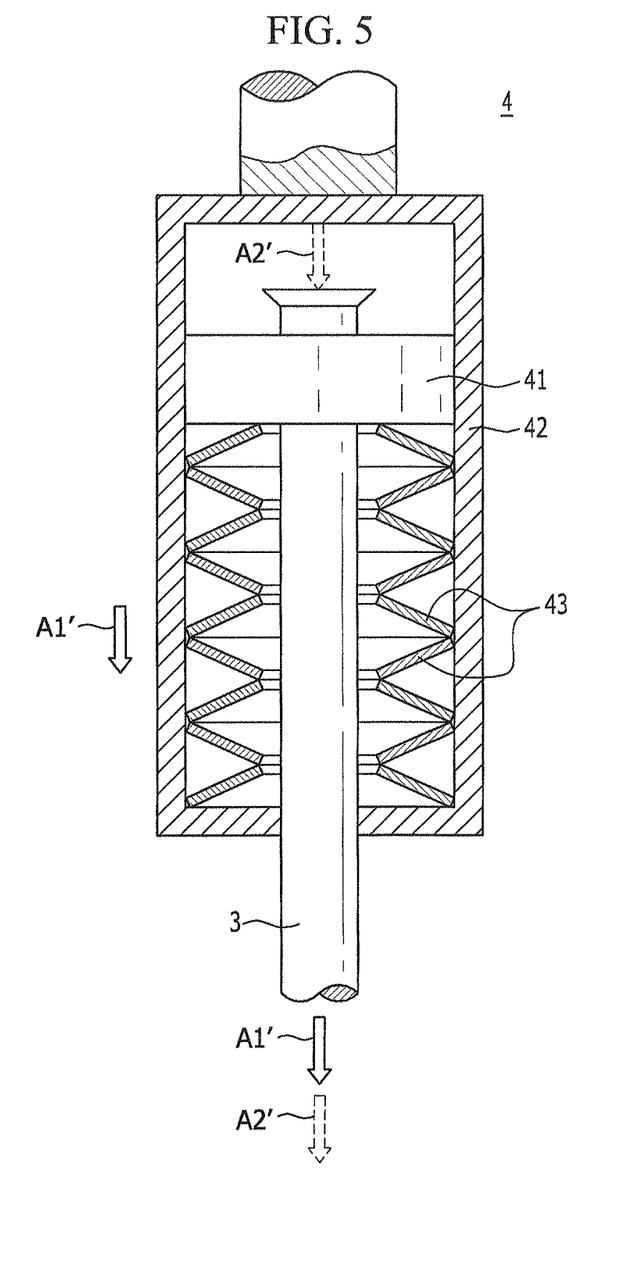
FIG. 5 is a cross-sectional view when the shock-absorbing part of FIG. 2 absorbs shock.

FIG. 5 is a cross-sectional view when the shock-absorbing part of FIG. 2 absorbs shock. Referring to FIG. 2 and FIG. 5, when the bearing 53 on the rod 3 moves down while being supported by the cam track 54 (left in FIG. 2), if an abnormal load, which is a load larger than a predetermined level, is transmitted to the piston 41, the first elastic member 43, and the cylinder 42 of the shock-absorbing part 4 through the rod 3, the shock-absorbing part 4 absorbs shock.

The excess in the abnormal load applied to the piston 41 through the bearing 53 and the rod 3 is absorbed by the first elastic member 43, and the predetermined level of the load is transmitted to the collet 2 through the first elastic member 43 and the cylinder 42.

That is, the shock-absorbing part 4 moves by the distance A1', which is the same as the distance A1 under the normal load shown in FIG. 4, and the rod 3 moves further down by an additional distance A2' from the distance A1' of the shock-absorbing part 4. Therefore, the total distance is A1'+A2' (A1'+A2' shown by the arrow length in FIG. 5). In this operation, the piston 41 is spaced apart from the inner side of the upper portion of the cylinder 42 and compresses the first elastic member 43. The additional distance A2 is the down-displacement of the piston 41 or the compressed amount of the first elastic member 43.

The additional distance A2 increases or decreases in accordance with the amount of the abnormal load, and is proportionate to the excessive load while the rod 3 moves down. As described above, since the rod 3 further moves down as much as the additional distance A2, the can 20 can be normally swaged, even if a load larger than a predetermined level is applied to the rod 3.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A swaging apparatus comprising:
a collet housing;
a collet coupled to the collet housing for swaging an opening of a can including an electrode assembly, a portion of the collet disposed outside the collet housing while the can is inserted into the collet, the portion of the collet being capable of moving inside the collet housing to swage the can;
a shock-absorbing part disposed in the collet housing and connected to the collet for absorbing shock; and
a rod connected to the shock-absorbing part to transmit a swaging load to the collet through the shock-absorbing part.

2. The apparatus of claim 1, further comprising:
a load cell disposed between the shock-absorbing part and the rod.

3. The apparatus of claim 1, further comprising:
a shaft that is rotatable;
a turret mounted to the shaft to integrally rotate with the shaft, the collet housing being mounted to the turret;
a bearing mounted to a portion of the rod protruding out of the turret; and
a cam track fixed in a position, the cam track initiating a movement of the rod through the bearing.

4. The apparatus of claim 3, wherein the shock-absorbing part comprising:
a cylinder connected to the collet;
a piston disposed inside the cylinder, the piston connected to an end of the rod; and
a first elastic member disposed inside the cylinder, the first elastic member disposed between the piston and a wall of the cylinder to support the piston.

5. The apparatus of claim 4, wherein the first elastic member includes a plurality of disc springs with the rod positioned through the center of the disc springs.

6. The apparatus of claim 4, further comprising;
a second elastic member disposed inside the collet housing, the second elastic member disposed between a wall of the collet housing and the shock-absorbing part.

7. The apparatus of claim 3, further comprising:
a can pusher mounted on an end portion of the shaft to support a side of the can.

8. The apparatus of claim 1, wherein the collet is capable of applying a swaging load of 300 kgf±50 kgf to swage the can.

9. The apparatus of claim 1, wherein the collet reshapes the can in a cylindrical shape by narrowing an expanded opening of the can.

10. A swaging apparatus for a rechargeable battery, comprising:
a collet for swaging a can of the rechargeable battery;
a rod coupled to the collet;
a shook-absorbing part disposed between the collet and the rod, the shock-absorbing part absorbing shock; and
a collet housing for accommodating the shock-absorbing part, the collet housing, guiding as movement of the collet that is coupled to the collet housing to swage the can the rechargeable battery, a portion of the collet disposed outside the collet housing while the can is inserted into the collet, the portion of the collet being capable of moving inside the collet housing to swage the can.

11. The apparatus of claim 10, wherein the shock-absorbing part comprising:
a cylinder, an upper wall of the cylinder being, connected to the collet;
a piston disposed inside the cylinder, the piston connected to an end of the rod; and
a first elastic member disposed inside the cylinder, the first member disposed between the piston and a lower will of the cylinder.

12. The apparatus of claim 10, further comprising;
a shaft that is rotatable about an axis of the shaft;
a turret mounted to the shaft to integrally rotate with the shaft, the collet housing being mounted to the turret;
a cam track fixed in a position; and
a bearing mounted to the rod and being capable of being coupled to the cam track, the collet being at a first position whenever the bearing is not coupled to the cam track, the collet being at a second position whenever the bearing is coupled to the cam track.

13. The apparatus of claim 12, wherein the portion of the collet is disposed outside the collet housing when the collet is in the first position, the portion of the collet is disposed inside the collet housing when collet is in the second position, and the can of the rechargeable battery is being swaged while the collet is in the second position.

14. The apparatus of claim 12, further comprising:
a second elastic member disposed inside the collet housing, the second elastic member disposed between a will of the collet housing and the shock-absorbing part.

15. The apparatus of claim 12, further comprising:
a can pusher mounted on an end portion of the shaft to integrally rotate with the shaft, the can pusher supporting a side of the can.

\* \* \* \* \*